May 19, 1964  E. M. MARWELL ETAL  3,133,678
GAS POWERED FLUID METERING AND DISPENSING MACHINE
Filed June 29, 1961  2 Sheets-Sheet 1

INVENTOR.
EDWARD M. MARWELL
CURTIS C. BEUSMAN
BY John B. Frisone
ATTORNEY.

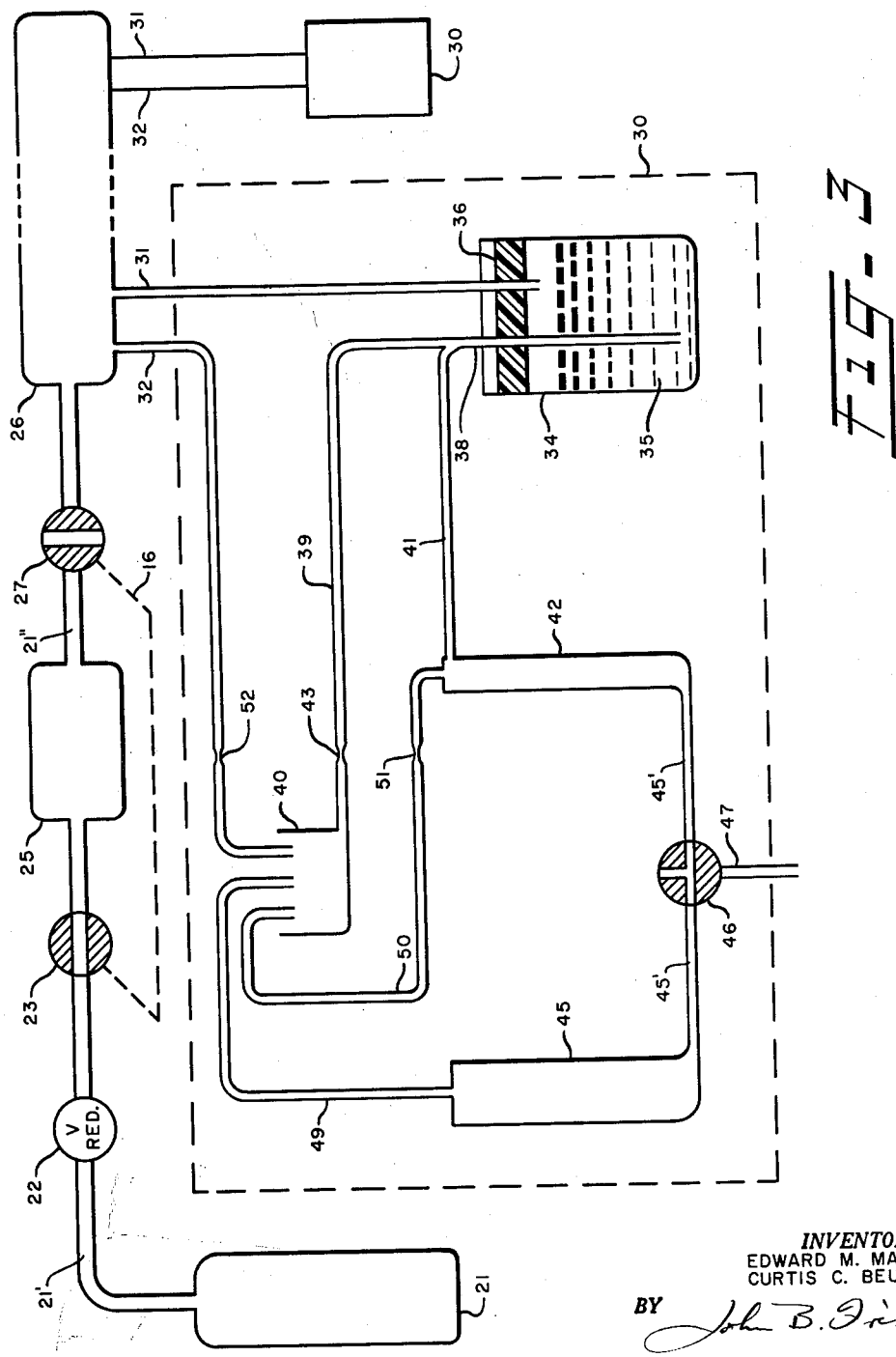

3,133,678
GAS POWERED FLUID METERING AND DISPENSING MACHINE
Edward M. Marwell and Curtis C. Beusman, Mount Kisco, N.Y., assignors to Finesse Products, Inc., a corporation of New York
Filed June 29, 1961, Ser. No. 120,599
10 Claims. (Cl. 222—204)

This invention is concerned with fluid metering and dispensing machines and more particularly with machines suitable for metering and dispensing controlled amounts of dyes which may be used to color shoes, luggage or other small objects which do not require large quantities of dye.

Within the past few years a trend has developed wherein women especially desire that the shoes they purchase match in color their other accessories such as gloves, handbags and hats. This has presented a problem to the retail shoe industry since it has placed a severe strain on their inventory requirements. One solution to this problem is to stock only a neutral shade in all shoe sizes and die the shoes selected by the purchaser to match the accessories she has selected.

However, storing and hand mixing the basic dyes necessary to provide the wide varieties of colors and shades demanded has presented additional problems. The average shoe salesman is unfamiliar with dyes and the mixing thereof and is therefore reluctant to attempt this task, but the limited number of sales in each retail outlet precludes the employment of one skilled in the shoe dyeing art to perform this function. In addition, this limited market also precludes the use of the extremely complicated and expensive metering and dispensing devices as exemplified in Patent Number 2,787,402 issued to Stiner et al. which the unskilled shoe salesman might be willing to operate.

One object of this invention is to provide a measuring and dispensing device suitable for measuring and dispensing dye fluids and diluents which is accurate in the measurement and delivery of small quantities of fluids.

Another object of this invention is to provide a dispensing device as set forth above which is reliable in operation and requires little or no maintenance.

A further and equally important object of this invention is to provide a dispensing device which is inexpensive to manufacture and which is easily operated by unskilled persons.

Yet another object of this invention is to provide a dispensing machine which will safely handle highly volatile dye and prevent the deterioration of those dyes which are damaged by oxidation.

Another object is to provide a dispensing machine which recirculates the dyes to maintain uniformity of color at all times.

The invention contemplates a measuring and dispensing device comprising, first and second fluid measuring chambers, valve means for providing fluid communication between the two chambers, a vented over-flow collector connected to the second chamber for receiving fluid therefrom when said chamber has been filled, fluid conducting means connected between a predetermined point on said first chamber and the vented collector, and timed means for supplying fluid under pressure to said first chamber to charge both chambers and the fluid conducting means connected between the first chamber and the over-flow collector whereby said conductor and chambers are drained into said timed supplying means by siphon action to the level of the predetermined point which provides a vacuum break to stop the siphon action and permits the retention of an accurately reproducible quantity of fluid in both chambers.

The foregoing and other objects and advantages of the invention will become more apparent from a consideration of the specification and drawings wherein one specific embodiment of the invention is described and shown in detail for illustration purposes only.

Figure 1:
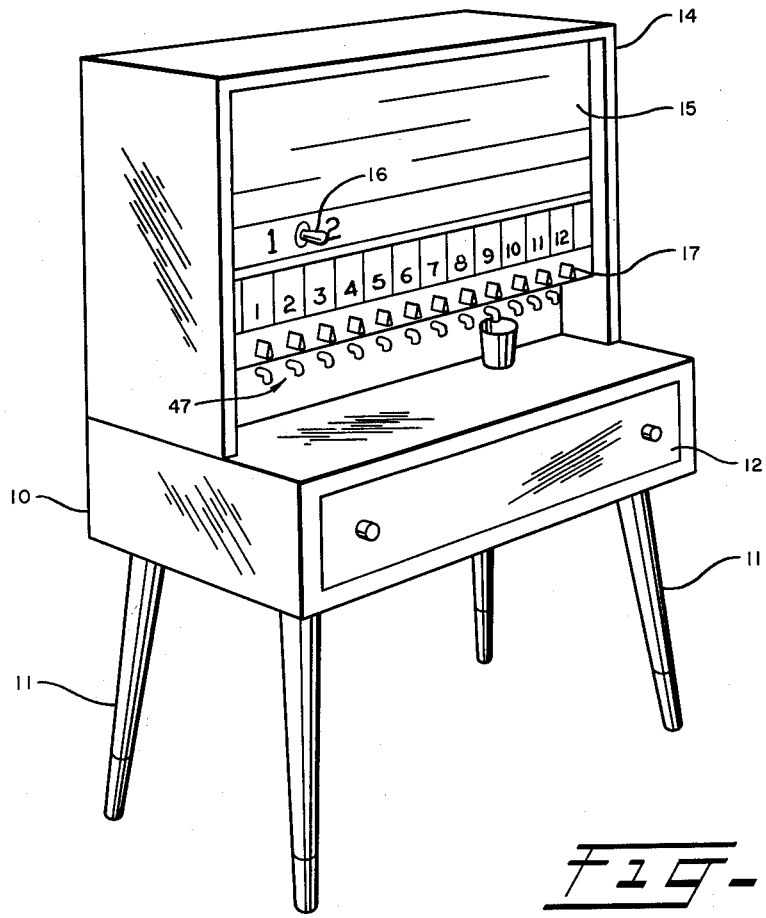
FIGURE 1 is an isometric drawing of a suitable enclosure for the novel gas powered fluid metering and dispensing apparatus.

In FIGURE 1 a base 10 is supported by four legs 11 which are attached to the bottom of the base. The base has a drawer 12 which may be used to store supplies and color charts. Above the base and supported thereon is a cover 14 having a front panel 15 which encloses the novel metering and dispensing apparatus illustrated in FIGURE 3.

Figure 2:
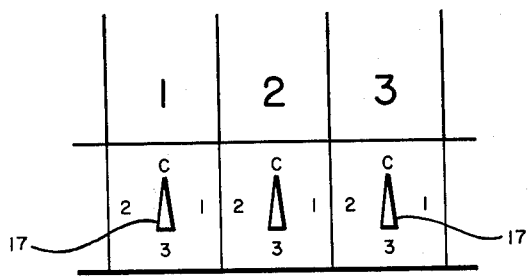
FIGURE 2 is a detail showing an elevation of the valve selector knobs shown in FIGURE 1; and, FIGURE 3 is a schematic diagram showing the essential components of the novel metering and dispensing apparatus.

Before proceeding with the description of FIGURE 3, a description of the operation of the device from the point of view of an operator will be presented. Mounted on the front panel 15 is a toggle switch 16 which may be moved to the left toward a position marked "1" or to the right toward a position marked "2." In addition, a plurality of valve position selector knobs 17 consecutively numbered 1–12 from left to right are arranged in a horizontal row on the panel 15. Each selector is rotatable in both the clockwise or counterclockwise directions and has clustered about it the position designations "C," "1," "2" and "3," as shown in FIGURE 2. In a unique dye system which was created to be used in conjunction with apparatus according to the present invention over 1,200 different predetermined colors and shades of dye solution may be blended merely by combining one or more of ten basic dye color solutions and one diluent. In this dye system all of the colors and shades may be formed by combining one or more of the basic dye color solutions and a diluent in volumes which bear certain volumetric ratios to each other for example, three, seven, ten; that is to say, a particular apparatus according to the present invention is capable of dispensing integral multiples of three unit volumes, seven unit volumes and ten unit volumes of each of the basic dye solutions and of the diluent. Thus, when a selector knob is in the "C" position the valve controlled by the knob is closed; in the "1" position three volumetric units of the color solution controlled by that valve will be dispensed; in the "2" position seven units will be dispensed; and in the "3" position ten units will be dispensed.

When the dye system referred to above is used, ten different color solutions are dispensed from valves controlled by knobs 17, numbered 3 through 12, and because of the considerably greater quantities of diluent used relative to the quantities of any one color solution the apparatus is arranged to dispense diluent through valves controlled by knobs numbered 1 and 2.

When a salesman wishes to dye a pair of shoes or other object, he consults a chart and selects the appropriate color and shade. The chart will inform him of the exact amounts of each basic color solution and diluent required to achieve the desired color and shade. He must first charge the machine. This requires that all of the selectors first be placed in the "C" position and thereafter that the toggle 16 be moved to the "1" position and thereafter moved to the "2" position. This simultaneously charges all the metering containers with the different color solutions and diluent. Thereafter he merely turns the appropriate selector knobs 17, in turn, to the position specified on the chart to withdraw from a nozzle under each selector knob the required quantity of each color solution.

These are collected in a mixing cup and when all the component solutions of the color and shade desired have been withdrawn they are mixed and applied to the object which is to be dyed. If a selector is turned to the number "1" position, a first predetermined quantity of fluid may be withdrawn; if to the number "2" position, a second predetermined quantity may be withdrawn; and to the number "3" position, the sum of the first and second predetermined quantities may be withdrawn. Diluent or some of the basic color solutions may be dispensed by more than one selector to provide additional quantities with a single charge of the dispensing apparatus.

Now turning to FIGURE 3, a cylinder 21 of pressure fluid, which in the preferred embodiment is liquefied carbon dioxide, is connected by a presure conduit 21' having a gas-pressure reducing valve 22 and a flow control valve 23 to a low pressure tank or reservoir 25. Of course, as the carbon dioxide is expanded through the pressure reducing valve into the low pressure reservoir, it changes from the liquid state to the gaseous state. Reservoir 25 is connected to a distribution manifold 26 by a pressure conduit 21" having a second flow control valve 27 which operates in synchronism with valve 23 by the toggle mechanism 16. Flow control valves 23 and 27 are differentially operated so that valve 27 is closed and manifold 26 is disconnected from low pressure reservoir 25 when the latter is connected to the cylinder 21 and the low pressure reservoir is disconnected from said cylinder when the distribution manifold is connected to the low pressure reservoir.

Distribution manifold 26 is connected to a plurality of identical measuring units 30, which in the embodiment illustrated in FIGURE 1, is twelve. Each unit 30 is connected to the manifold by two pressure conduits 31 and 32.

Conduit 31 conducts the pressure fluid in manifold 26 to a liquid reservoir 34 which may contain dye solution or diluent 35. The conduit passes through a pressure sealing cover 36 and subjects the dye solution or diluent contained within reservoir 34 to the gas in the manifold which provides a pumping pressure for charging the metering circuit to be described. A fluid conduit 38 extends from the bottom of reservoir 34 and passes through pressure sealing cover 36. Above the cover 36 conduit 38 divides in a Y having one leg 39 thereof connected to an over-flow container 40 and its other leg 41 connected to the upper end of a first measuring chamber 42. Leg 39 has a flow restriction 43 to assure flow of the liquid being measured into measuring chamber 42 during the charging operation.

The bottom end of chamber 42 is connected to the bottom end of a second measuring chamber 45 by a fluid conduit 45' having a four-position T-valve 46 which connects the two measuring chambers whenever selector 17 is in the "C" or "3" position, see detail FIGURE 2. In FIG. 3 valve 46 is shown in the "C" position which connects chambers 42 and 45. When the selector knob is moved to the "1" position, chamber 42 is connected to a spout 47 and the dye or diluent contained therein is withdrawn to a mixing cup. When the selector knob is turned to the "2" position, chamber 45 is connected to spout 47 and when selector knob 17 is turned to the "3" position, chambers 42 and 45 are both connected to spout 47. In the preferred embodiment, chamber 45 contains 7 units of volume and chamber 42 contains 3 units, thus, chamber 42 provides 3 units of measure; chamber 45, 7 units of measure; and chambers 42 and 45, 10 units of measure. It should be noted that these ratios are not critical and may be varied to suit any particular application of the apparatus according to the invention. The upper end of chamber 45 is connected by a fluid conduit 49 to over-flow container 40. Another fluid conduit 50, having a restriction 51 connects the upper end of chamber 42 to overflow container 40.

The system is normally charged with the valve 46 in the closed or "C" position shown in FIG. 3. When pressure fluid is admitted to reservoir 34, the dye or diluent in the reservoir is forced through conduits 38 and 41 into chamber 42 and from there through valve 46 into chamber 45. At the same time, conduits 39, 49 and 50 are also filled with the dye. Pressure fluid is leaked from manifold 26 via conduit 32 to the upper portion of open over-flow container 40. A restriction 52 in conduit 32 provides a pressure release means and is proportioned so that the pressure in manifold 26 and the reservoirs will be reduced to atmospheric pressure after sufficient time has elapsed to charge all of the conduits and chambers with dye or diluent, as the case may be.

After the system is charged and the pressure in manifold 26 is reduced to atmospheric, the fluid in the charged system starts flowing by siphon action back into reservoir 34. However, all of the fluid does not make it back since conduit 50 breaks the vacuum and two columns of equal height remain in chambers 42 and 45. Thus, the internal cross-sectional area of these chambers determines the amount of fluid retained in chamber 45 and chamber 42. The height of the columns is determined by the height of the junction of conduit 41 and chamber 42 and thus may be selected to provide a specific volume by taking into consideration the cross-sectional area of chambers 42 and 45.

While only one embodiment of this invention has been shown and described for illustration purposes only, it is to be expressly understood that the invention is not limited to this specific embodiment.

What we claim is:

1. A fluid metering and dispensing system comprising a closed fluid reservoir, first and second vented metering chambers positioned such that their upper extremities are above the fluid level in said reservoir, fluid conduit means interconnecting said metering chambers at a first level, fluid conduit means connecting said reservoir at a level below the fluid level therein to one of said metering chambers at a second level above said first level, and means for selectively varying the pressure on the fluid in said reservoir, whereby, upon increasing the pressure in said fluid in said reservoir, fluid is forced through said fluid conduit means and to said metering chambers to fill said chambers at least to said second level and then, upon reducing the pressure on said fluid in said reservoir, fluid in said system above said second level returns through said fluid conduit means to said reservoir while fluid in amounts determined by the volumes of the metering chambers is retained therein, and valve means for selectively withdrawing the fluid retained in either or both of said metering chambers.

2. A fluid metering and dispensing system comprising a closed fluid reservoir, an overflow collector vessel positioned above said reservoir, first and second metering chambers positioned such that their upper extremities are above the fluid level in said reservoir, fluid conduit means connecting the upper extremities of said metering chambers to said overflow vessel, fluid conduit means constructed and arranged to interconnect said metering chambers at a first level, fluid conduit means constructed and arranged to connect said fluid reservoir at a level below the liquid level therein to one of said metering chambers at a second level above said first level, fluid conduit means constructed and arranged to connect said fluid reservoir to said overflow vessel, and means for selectively varying the pressure on the fluid in said reservoir, whereby, upon increasing the pressure in said fluid in said reservoir, fluid is forced through said fluid conduit means to said metering chambers to fill said chambers at least to said second level and then, upon reducing the pressure on said fluid in said reservoir, fluid in said system above said second level returns through said fluid conduit means to said reservoir while fluid in amounts determined by the volumes of the metering chambers is retained therein, and valve means for selectively withdrawing the fluid retained in either or both of said metering chambers.

3. A fluid metering system according to claim 2 and in which said means for selectively varying the pressure on the fluid in said reservoir is a source of pressurized gas and valved conduit means connecting said source to said reservoir.

4. A fluid metering and dispensing system comprising a closed fluid reservoir, an overflow collector vessel positioned above said reservoir, first and second metering chambers positioned such that their upper extremities are above the fluid level in said reservoir, fluid conduit means connecting the upper extremities of said metering chambers to said overflow vessel, fluid conduit means constructed and arranged to interconnect said metering chambers at a first level, fluid conduit means constructed and arranged to connect said fluid reservoir at a level below the liquid level therein to one of said metering chambers at a second level above said first level, fluid conduit means constructed and arranged to connect said fluid reservoir to said overflow vessel, a source of pressure fluid, pressure conduit means connecting said source to said reservoir, valve means for selectively admitting pressure fluid through said pressure conduit from said source to said reservoir, and pressure releasing means in communication with said reservoir for reducing pressure in said reservoir due to introduction of pressure fluid from said source and valve means for selectively withdrawing fluid retained in either or both of said metering chambers, whereby upon increasing the pressure in said fluid in said reservoir, fluid is forced through said fluid conduit means and to said metering chambers to fill said chambers at least to said second level and then, upon reducing the pressure on said fluid in said reservoir, fluid in said system above said second level returns through said fluid conduit means to said reservoir while fluid in amounts determined by the volumes of the metering chambers is retained therein.

5. A fluid metering and dispensing system comprising a plurality of metering and dispensing subsystems, each of said subsystems comprising a closed fluid reservoir, first and second vented metering chambers positioned such that their upper extremities are above the fluid level in said reservoir, fluid conduit means interconnecting said metering chambers at a first level, fluid conduit means connecting said reservoir at a level below the fluid level therein to one of said metering chambers at a second level above said first level, and means for selectively and simultaneously varying the pressure on the fluid in each of said reservoirs, whereby, upon increasing the pressure on the fluid in each of said reservoirs, fluid is forced from each of said reservoirs through said fluid conduit means and to the metering chambers of each subsystem to fill the respective metering chambers at least to the second level of each respective subsystem and then, upon reducing the pressure in the fluid in each of said reservoirs, fluid in each of said subsystems above the second level of each subsystem returns through said fluid conduit means of that subsystem to the reservoir thereof, and quantities of fluid predetermined by the volumes of the metering chambers of each subsystem are retained in said chambers.

6. A fluid metering and dispensing system according to claim 5 and which further comprises valve means for each subsystem for selectively withdrawing the fluid retained in either or both of the metering chambers thereof.

7. A fluid metering and dispensing system according to claim 5 and in which said means for selectively and simultaneously varying the pressure on the reservoir fluids comprises a manifold having an inlet connected by valved pressure conduit means to said source of pressure fluid and also having an outlet connected by pressure conduit means to the reservoir in each of said subsystems.

8. A fluid metering and dispensing system comprising a plurality of metering and dispensing subsystems, each of said subsystems comprising a closed fluid reservoir, an overflow collector vessel positioned above said reservoir, first and second metering chambers positioned such that their upper extremities are above the fluid level in said reservoir, fluid conduit means connecting the upper extremities of said metering chambers to said overflow vessel, fluid conduit means constructed and arranged to interconnect said metering chambers at a first level, fluid conduit means constructed and arranged to connect said fluid reservoir at a level below the liquid level therein to one of said metering chambers at a second level above said first level, fluid conduit means constructed and arranged to connect said fluid reservoir to said overflow vessel, and means for selectively and simultaneously varying the pressure on the fluid in each of said reservoirs, whereby, upon increasing the pressure on the fluid in each of said reservoirs, fluid is forced from each of said reservoirs through said fluid conduit means and to the metering chambers of each subsystem to fill the respective metering chambers at least to the second level of each respective subsystem, and then, upon reducing the pressure in the fluid in each of said reservoirs, fluid in each of said subsystems above the second level of each subsystem returns through said fluid conduit means of that subsystem to the reservoir thereof, and quantities of fluid predetermined by the volumes of the metering chambers of each subsystem are retained in said chambers.

9. A fluid metering and dispensing system according to claim 8 and which further comprises valve means for each subsystem for selectively withdrawing the fluid retained in either or both of the metering chambers thereof.

10. A fluid metering and dispensing system according to claim 9 and in which said pressure fluid is chemically inert with respect to the fluid in said reservoirs.

References Cited in the file of this patent
UNITED STATES PATENTS

| | | |
|---|---|---|
| 1,675,231 | Stoke | June 26, 1928 |
| 2,787,402 | Stiner | Apr. 2, 1957 |